United States Patent [19]
Coleman et al.

[11] Patent Number: 5,709,196
[45] Date of Patent: Jan. 20, 1998

[54] FUEL CONTROL SYSTEM FOR AN INTERNAL COMBUSTION ENGINE USING A LOW CETANE QUALITY FUEL

[75] Inventors: Gerald N. Coleman, Peoria; James E. Sibley, Metamora, both of Ill.

[73] Assignee: Caterpillar Inc., Peoria, Ill.

[21] Appl. No.: 760,938

[22] Filed: Dec. 6, 1996

Related U.S. Application Data

[60] Provisional application No. 60/026,617, Sep. 24, 1996.
[51] Int. Cl.⁶ ............................................. F02M 59/20
[52] U.S. Cl. ........................... 123/672; 123/501; 123/575
[58] Field of Search ................................ 123/1 A, 501, 123/502, 575, 672

[56] References Cited

U.S. PATENT DOCUMENTS

| | | | |
|---|---|---|---|
| 3,890,946 | 6/1975 | Wahl | 123/684 |
| 4,031,864 | 6/1977 | Crothers | 123/1 A |
| 4,397,285 | 8/1983 | O'Neill | 123/502 |
| 4,402,296 | 9/1983 | Schwarz | 123/575 |
| 4,426,982 | 1/1984 | Lehner et al. | 123/501 |
| 4,606,322 | 8/1986 | Reid et al. | 123/575 |
| 4,876,988 | 10/1989 | Paul et al. | 123/1 A |
| 4,942,848 | 7/1990 | Terasaka | 123/1 A |
| 4,945,882 | 8/1990 | Brown et al. | 123/695 |
| 4,955,326 | 9/1990 | Helmich | 123/27 GE |
| 4,995,367 | 2/1991 | Yamauchi et al. | 123/494 |

*Primary Examiner*—Tony M. Argenbright
*Attorney, Agent, or Firm*—Robert J. Hampsch

[57] ABSTRACT

A method and system for the control of the fuel injection timing in an internal combustion engine using a low cetane quality fuel such as an aqueous fuel emulsion is provided. The disclosed system includes a compression ignition engine adapted to receive a prescribed supply of an aqueous fuel emulsion. The prescribed supply of fuel is preferably determined by an fuel system control unit as a function of one or more engine operating parameters. The disclosed system also includes an exhaust sensor located proximate the engine exhaust so as to detect the presence and level of selected exhaust products, such as carbon monoxide, in the engine exhaust. The level of carbon monoxide or other such exhaust product, as measured by the sensor, is input to the engine control unit where it is processed together with various other engine operating parameters to produce a prescribed fuel injection timing signal which operatively controls the fuel injection timing.

18 Claims, 4 Drawing Sheets

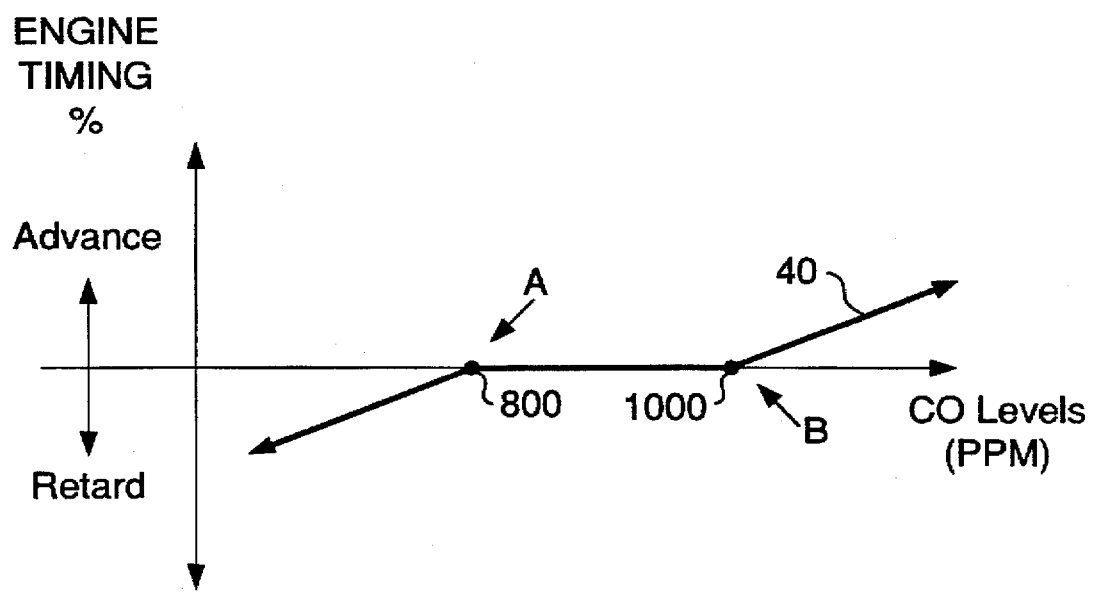
Fig_2_

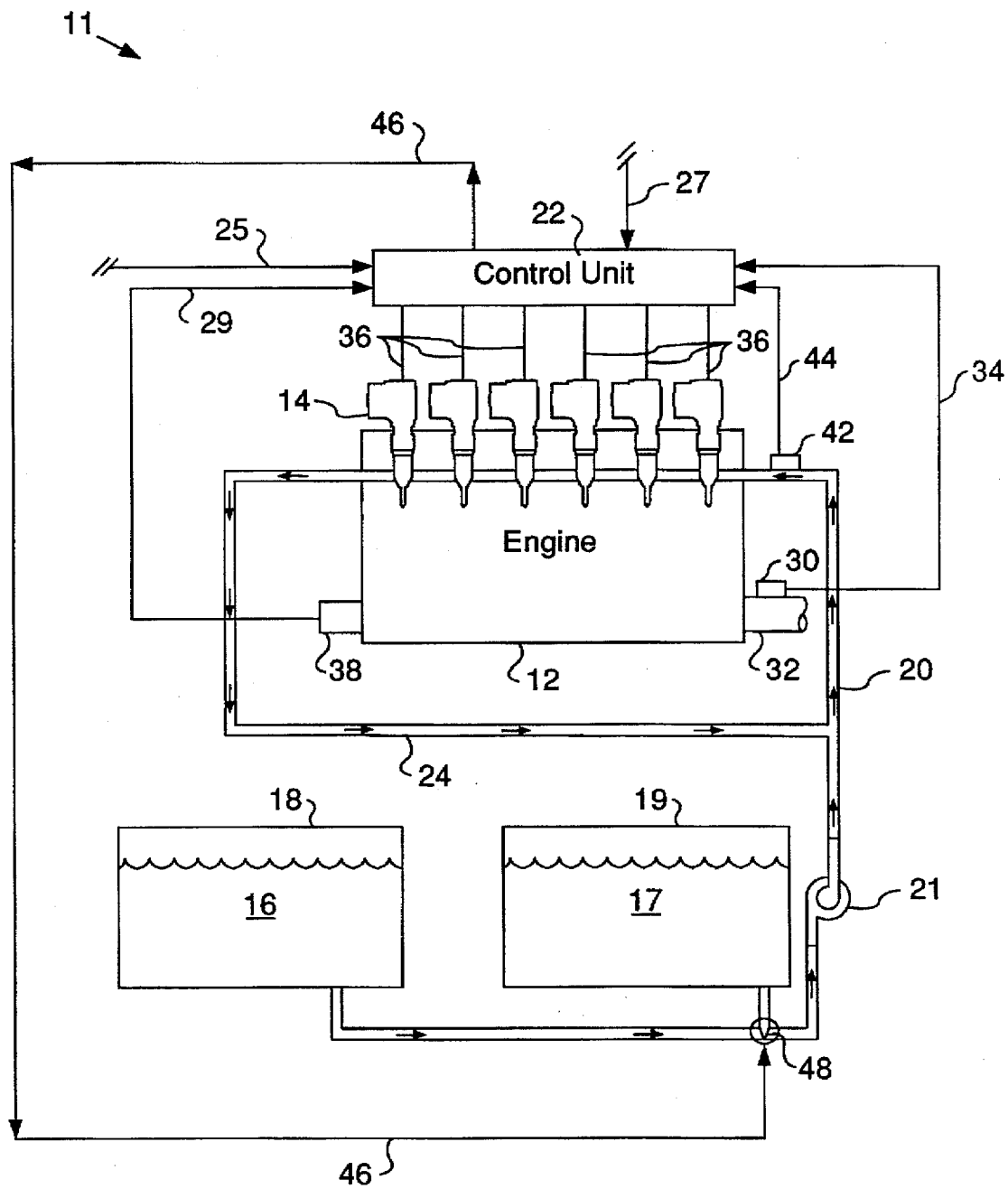
Fig_3_

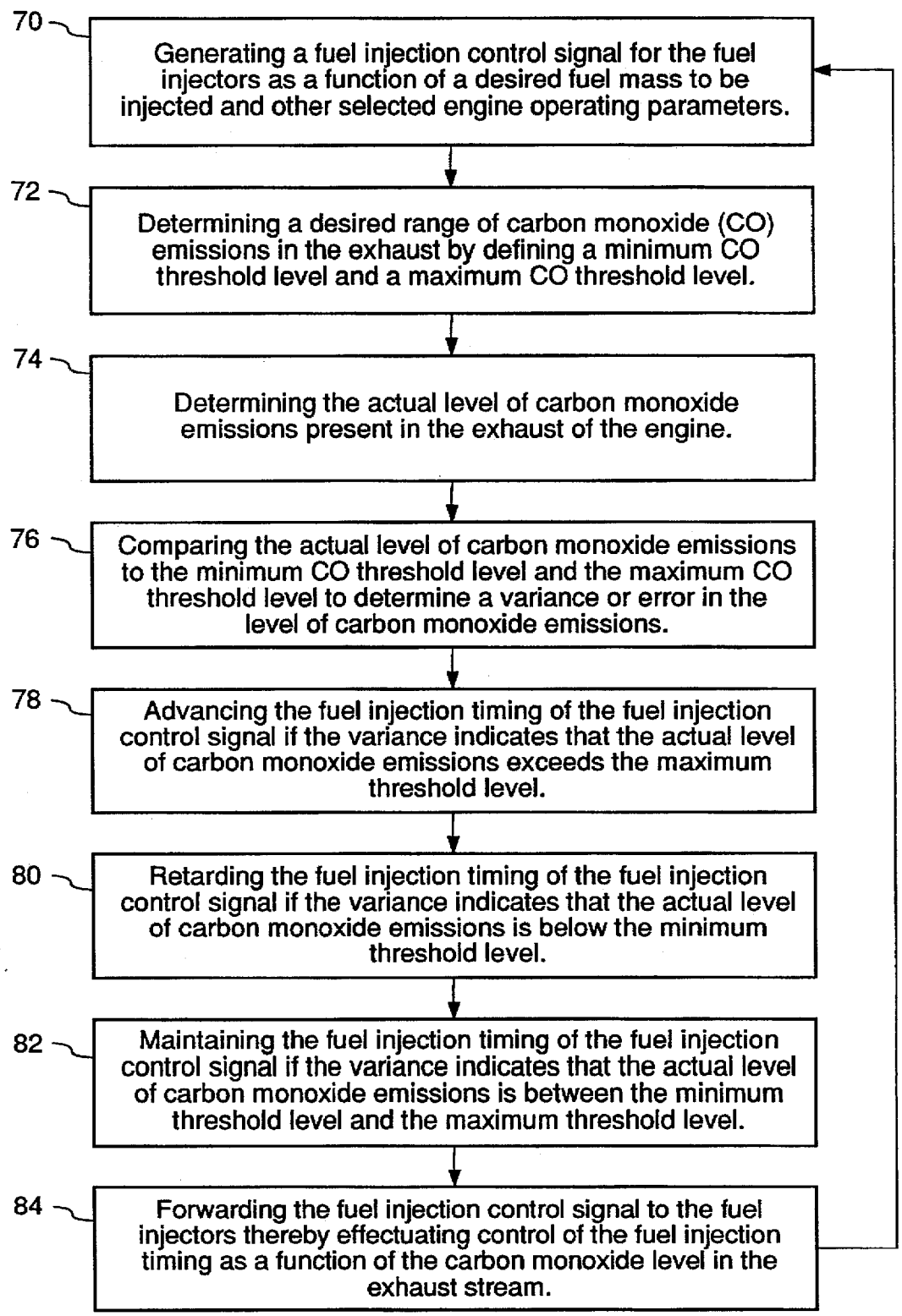

FUEL CONTROL SYSTEM FOR AN INTERNAL COMBUSTION ENGINE USING A LOW CETANE QUALITY FUEL

CROSS REFERENCE TO RELATE APPLICATIONS

This application is based, in part, on the material disclosed in United States provisional patent application Ser. No. 60/026617 filed Sep. 24, 1996.

FIELD OF THE INVENTION

The present invention relates to a fuel control system for an internal combustion engine that utilizes a low cetane quality fuel, such as an aqueous fuel emulsion, as a source of fuel. More particularly, the present invention relates to a method and system for optimizing emissions and performance of a compression ignition engine where the fuel is a low cetane quality fuel such as a fuel in water emulsion.

BACKGROUND

Recent fuel developments have resulted in a number of aqueous fuel emulsions comprised essentially of a carbon based fuel, water, and various additives such as lubricants, surfactants, corrosion inhibitors, cetane improvers, and the like. It is the surfactant that acts to couple the water molecules with the carbon based fuel without separation. These aqueous fuel emulsions may play a key role in finding a cost-effective way for internal combustion engines including, but not limited to, compression ignition engines (i.e. diesel engines) to achieve the reduction in emissions below the mandated levels without significant modifications to the engines, fuel systems, or existing fuel delivery infrastructure.

Advantageously, aqueous fuel emulsions tend to reduce or inhibit the formation of nitrogen oxides (NOx) and particulates (i.e. combination of soot and hydrocarbons) by altering the way the fuel is burned in the engine. Specifically, the fuel emulsions are burned at somewhat lower temperatures than a comparable non-aqueous fuel due to the presence of water. This, coupled with the realization that at higher peak combustion temperatures, more NOx are typically produced in the engine exhaust, one can readily understand the advantage of using aqueous fuel emulsions.

Thus, the reduction in NOx is achieved using aqueous fuels primarily because an aqueous fuel emulsion has a lower peak combustion temperature. The actual reduction achieved, however, depends on a number of factors including the composition of the fuel emulsion (e.g. fuel to water ratio), engine/ignition technology, engine operating conditions, etc. Moreover, having a lower peak combustion temperature does not necessarily mean that the aqueous fuel is providing less total energy or doing less work for a given mass of hydrocarbon fuel. Rather, the addition of water only requires a proportional increase in the volume of aqueous fuel to be injected in order to achieve the equivalent amount of work. However, as the volume of fuel that has to be injected increases, the engine performance considerations change. For example, the additional volume of aqueous fuel required in order to achieve the same amount of work imposes additional constraints and other design considerations in the fuel delivery systems, fuel control systems, fuel storage systems and other related systems in the compression ignition engine.

The operation of an engine operating on an aqueous fuel emulsion is controlled basically by varying the amount of fuel delivered to the engine cylinders and by setting the time of fuel injection into the cylinders relative to the time that the pistons reach top dead center on their compression strokes. In general, the amount of fuel delivered to the engine will control the speed of the engine and the timing of fuel injection will affect the efficiency of fuel combustion, engine operation, and exhaust emissions.

Within certain limits, as the timing is advanced, the fuel conversion efficiency improves and the NOx emissions increase. Conversely, as the engine timing is retarded, the fuel conversion efficiency is reduced while the NOx emissions are also reduced. Thus, active control of the engine timing is, in essence, a technique for balancing the NOx emissions in view of the fuel conversion efficiency. What is needed, therefore is an improved method and system for controlling engine timing for aqueous fuel emulsions to achieve the optimum balance between NOx emissions and fuel conversion efficiency.

It is also well known that aqueous fuel emulsions reduce the ignition quality of the fuel to a point where combustion quality is marginal and engine performance suffers. This is particularly relevant at light load conditions, engine starting conditions, and under engine warm-up conditions. Furthermore, the poor engine performance can be detected by monitoring the carbon monoxide in the exhaust emissions. As the ignition quality suffers, the carbon monoxide emissions increase. The increase in carbon monoxide emissions resulting from the poor combustion can be reduced by advancing the injection timing at the cost of a NOx emissions penalty. Thus, there is a continuing need to provide a fuel control system and technique that achieves the optimum balance between engine performance and engine emissions in an engine using an aqueous fuel emulsion or other low cetane quality fuel under light load conditions, warm-up conditions, and other peculiar engine operating conditions.

Another problem which results in sacrificing emissions levels in favor of minimum engine performance is peculiar to engines using flex-fuel systems. Many engine designs that could utilize a fuel in water emulsion could also be adapted to utilize other, more conventional fuels. An engine that is adapted to use more than one fuel type is broadly referred to as a flex-fuel engine. For reasons of safety, the fuel variability in a flex-fuel system typically requires that the fuel injection timing be advanced far enough that the engine performance with all fuels is acceptable, regardless of the fuel actually used. However, as the fuel injection timing is advanced the NOx emissions are increased. Thus, to achieve acceptable engine performance in many conventional flex fuel systems, the level of NOx emissions has typically been compromised. Accordingly, there is also a continuing need to provide a fuel control system that achieves the optimum balance between engine performance and engine emissions in a flex-fuel engine.

SUMMARY OF THE INVENTION

The present invention addresses the above and other needs by providing a method and system for the control of the fuel injection timing in a compression ignition engine using a low cetane quality fuel such as an aqueous fuel emulsion. The disclosed system includes a compression ignition engine adapted to receive a prescribed supply of an aqueous fuel emulsion. The prescribed supply of fuel is preferably determined by an fuel system control unit as a function of one or more engine operating parameters. The disclosed system also includes an exhaust sensor located proximate the engine exhaust so as to detect the presence and level of selected exhaust products, such as carbon monoxide, in the engine exhaust. The level of carbon monoxide or other exhaust product, as measured by the sensor, is input to the engine control unit where it is processed together with various other engine operating parameters to produce a prescribed fuel injection timing signal which operatively controls the fuel injection timing.

Accordingly, an important aspect of this embodiment of the aqueous fuel control system is provided by the control unit which effectively controls the aqueous fuel injection timing in response to the carbon monoxide levels present in the exhaust of the engine.

BRIEF DESCRIPTION OF THE DRAWINGS

The above and other aspects, features, and advantages of the present invention will be more apparent from the following, more descriptive description thereof, presented in conjunction with the following drawings, wherein:

FIG. 2 is a graphical representation of an engine timing strategy which is a function of carbon monoxide levels in the exhaust at prescribed engine operating conditions;

FIG. 3 is a schematic representation of another embodiment the present fuel control system particularly adapted for use with a flex-fuel system where one of the fuels is an aqueous fuel; and FIG. 4 is a block diagram generally depicting the preferred method for controlling the fuel injection timing as a function of the carbon monoxide levels present in the exhaust of a compression ignition engine using an aqueous fuel emulsion.

Corresponding reference numbers indicate corresponding components throughout the several views of the drawings.

DETAILED DESCRIPTION OF THE INVENTION

Figure 1:
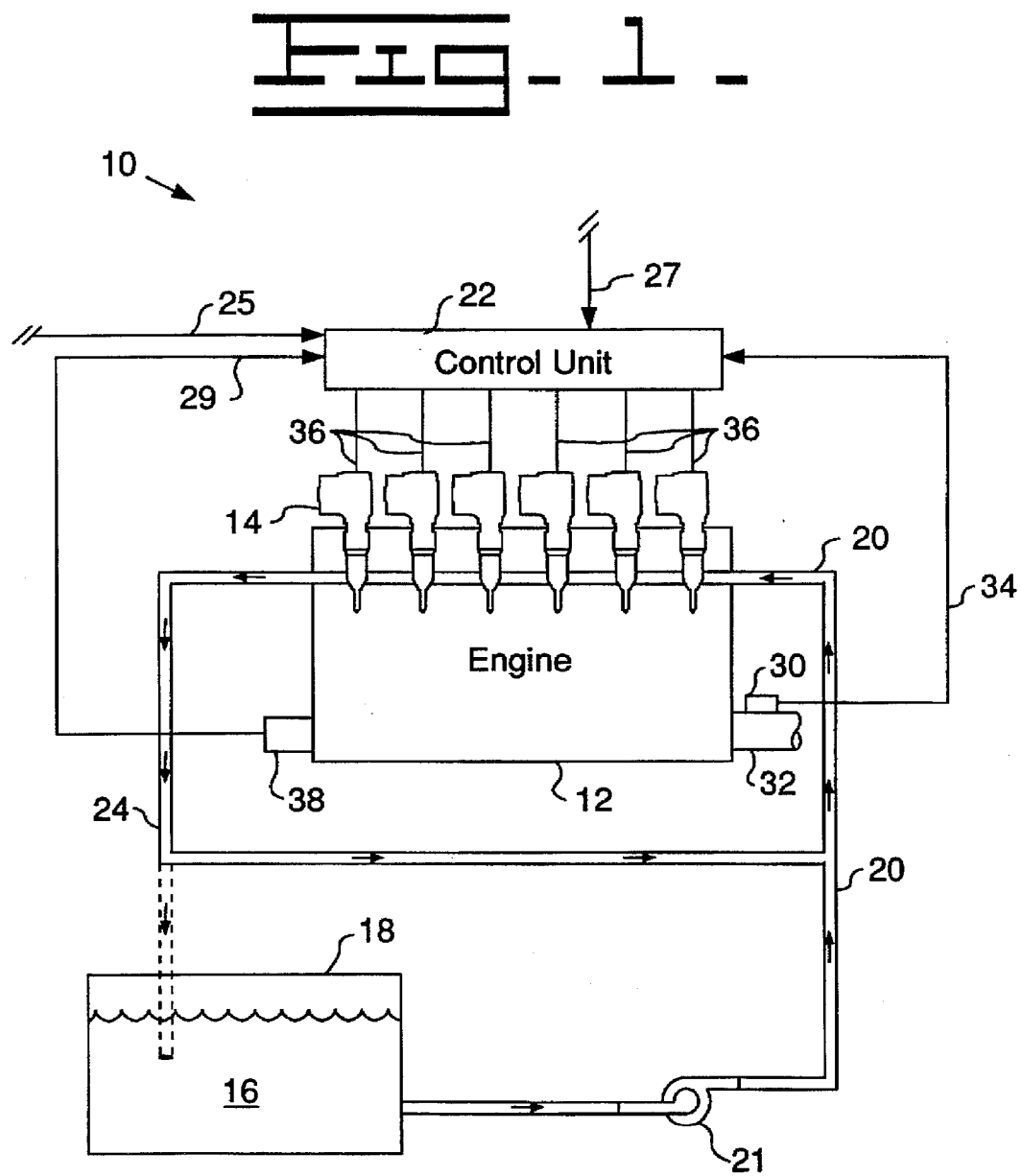
FIG. 1 is a schematic representation of the aqueous fuel control system for a compression ignition engine using an aqueous fuel emulsion in accordance with one embodiment of the invention.

The following description is of the best mode presently contemplated for carrying out the invention. This description is not to be taken in a limiting sense, but is made merely for the purpose of describing the general principals of the invention. The scope of the invention should be determined with reference to the claims.

Turning now to the drawings and particularly to FIG. 1, there is shown a schematic representation of an embodiment of the fuel control system 10 for an internal combustion engine 12 using an aqueous fuel emulsion. The system in FIG. 1 is comprised of a compression ignition engine 12 including a plurality of fuel injectors 14 adapted to receive a prescribed supply of aqueous fuel emulsion 16 from a fuel tank 18 via a pump 21 and fuel line 20. The prescribed quantity of fuel supplied to the injectors 14 is preferably determined by a control unit 22 as a function of one or more engine operating parameters such as actual speed of the engine 25, the desired speed of the engine 27, the operating temperatures of the engine 29 measured using a temperature sensor 38, and other engine operating and control parameters generally known to those persons skilled in the art. Any excess fuel supplied to the engine and not consumed thereby is typically returned via a fuel return conduit 24 to the fuel line 20 or to the fuel tank 18.

In the illustrated schematic, an appropriate sensor 30 is located proximate the engine exhaust 32 so as to detect the presence and level of selected exhaust products in the engine exhaust 32. The level of the selected exhaust products, as measured by the sensor 30 is input to the engine control unit 22. The engine control unit 22 processes the exhaust sensor input 34 together with other engine operating parameters 25,27,29 and produces the prescribed fuel injection timing signal 36 which operatively controls the aqueous fuel injection timing.

Carbon monoxide is a good indicator of overall engine performance. When the presence of carbon monoxide in the exhaust increases dramatically the engine performance is generally unacceptable. Similarly, a sharp decrease in the level of carbon monoxide in the exhaust stream exiting the engine cylinders is indicative of high NOx levels. If, however, the level of carbon monoxide present within the engine exhaust is within an acceptable predetermined range, then the engine performance as well as the NOx emission levels are typically considered to be acceptable.

Thus, in a preferred embodiment, the actual control the aqueous fuel injection timing is actively based on the measured carbon monoxide levels detected in the exhaust. Ideally, the control of the aqueous fuel injection timing should be effectuated in an effort to optimize or balance engine performance in view of the NOx emissions.

Specifically, the disclosed embodiment of the fuel control system is adapted to measure the level of carbon monoxide in the engine exhaust and retard the fuel injection timing if the carbon monoxide was below some minimum threshold level of carbon monoxide (e.g., 800 ppm). To achieve the lowest possible NOx levels and still have acceptable engine performance, the injection timing should be retarded until the carbon monoxide levels in the exhaust begin to increase. This results in relatively low NOx levels in the exhaust while maintaining acceptable engine performance (i.e. no audible misfire and good transient response). Conversely, the fuel injection timing is advanced if the carbon monoxide level in the engine exhaust was above some other predetermined maximum threshold level of carbon monoxide (e.g., 1000 ppm). The acceptable carbon monoxide levels, including any prescribed minimum levels and maximum levels tolerated, is preferably tailored to the particular engine, are highly dependent on the anticipated operating environment, and the specific application in which it is used.

Turning next to FIG. 2 there is shown a graphical representation of an engine timing strategy which is a function of carbon monoxide levels in the exhaust and the engine operating speed. In the illustrated graph, timing curve 40 represents engine timing as a function of carbon monoxide levels in the engine exhaust for a first engine operating speed and a particular aqueous fuel emulsion. For example, at a given desired engine speed, if the carbon monoxide was below some minimum threshold level of carbon monoxide, point A (e.g., 800 ppm), then the fuel injection timing is retarded by a prescribed amount or percentage. Conversely, the fuel injection timing is advanced by a prescribed amount or percentage if the carbon monoxide level in the engine exhaust was above some other predetermined maximum threshold level of carbon monoxide, identified as point B (e.g., 1000 ppm). If, however, the carbon monoxide level in the engine exhaust is within the acceptable range (i.e. between point A and point B) for a particular engine, operating in given conditions, with a prescribed fuel type and engine speed, then the fuel injection timing need not be adjusted.

In other words, the desired engine timing strategy varies depending on the levels of carbon monoxide present in the engine exhaust. The capability to vary engine timing as function of the levels of carbon monoxide present in the engine permits a wider range of engine operation while still meeting engine performance and engine emission requirements when using low cetane quality fuels such as aqueous fuel emulsions.

Another embodiment of the present fuel emulsion control system for an internal combustion engine which uses an aqueous fuel emulsion focuses on the control of the fuel injection timing in a flex fuel system. Before describing this embodiment, it may be helpful to review some general background material relating to the use of aqueous fuels in flex fuel systems. One of the most promising benefits of aqueous fuel compositions is the relatively small number of engine modifications required on select diesel engines in order to effectively use the fuel. Most of the modifications center around the fuel system. Specifically, various modifications to the diesel engine should be considered to compensate for fuel compositions having a cetane quality lower the conventional diesel fuel. Historically, fuel injection timing has been advanced a prescribed amount to ensure that engine performance is acceptable regardless which fuel is used. Advancement in the fuel injection timing in a flex-fuel system, however, often results in a significant emissions penalty due to the increase in NOx emissions.

In an effort to minimize the increase in NOx emissions resulting from the advancement of fuel injection timing in flex fuel systems, the present fuel control system actively controls the timing of the fuel injection in response to the content of the exhaust emissions, which correlates to some extent with the overall engine performance. Thus, the present embodiment of the fuel control system functions to optimize engine exhaust emissions in a flex fuel system while always maintaining acceptable engine performance regardless of the fuel used.

With the foregoing in mind, the embodiment depicted in FIG. 3 is a flex-fuel system 11 comprised of a compression ignition engine 12 including a plurality of fuel injectors 14 adapted to receive a prescribed supply of fuel 16 from one of two sources of fuel 16,17. Each source of fuel in the flex fuel system 11 resides in separate fuel tanks 18,19 which are coupled to the engine 12 via one or more fuel lines 20. The actual fuel sent to the engine 12 is preferably controlled by a fuel control unit 22 as a function of one or more engine operating parameters. Alternatively, the actual fuel used by the engine 12 can be selected or otherwise determined by the engine operator. Any excess fuel supplied to the engine and not consumed thereby is typically returned to the fuel line 20 by means of a fuel return conduit 24.

In the illustrated schematic, a fuel type sensor 42 is located along the fuel line 20 upstream of the engine 12 and operatively coupled to the fuel control unit 22. The fuel type sensor 42 determines which fuel or fuel mixture is being combusted within the engine 12. In addition, an exhaust gas sensor 30 is located proximate the engine exhaust 32 so as to detect the presence and level of selected exhaust products in the engine exhaust 32. The emission signal 34 or level of the selected exhaust products, as measured by the exhaust gas sensor 30 together with the fuel type 44, as determined using the fuel sensor 42 is input to the fuel control unit 22. The fuel control unit 22 processes these inputs together with other engine design and operating parameters 25,27,29 to generate the appropriate signals 36,46 which operatively control the fuel valve 48 and fuel injection timing.

As indicated above, carbon monoxide is a good indicator of overall engine performance. Thus, in the disclosed flex-fuel embodiment, the actual control the fuel injection timing is actively based, in part, on the measured carbon monoxide levels detected in the exhaust. If the carbon monoxide levels in the engine exhaust are below some minimum threshold level of carbon monoxide the fuel injection timing is retarded, regardless which fuel is being used. If, however, the carbon monoxide level in the engine exhaust is above some other predetermined maximum threshold level of carbon monoxide, the fuel injection timing is advanced at a rate that is dependent on the fuel used. The acceptable carbon monoxide levels, including any prescribed minimum levels and maximum levels tolerated, is dependent on the engine configuration, engine operating conditions, and type or concentration of fuel used. The engine configuration, engine operating conditions, and type of fuel used is information that is monitored and readily available within the fuel control unit.

In one or both of the disclosed embodiments, the engine control unit includes a plurality of "timing maps" for controlling engine timing as a function of the fuel type and various engine operating parameters together with the engine exhaust content, as depicted in FIG. 4. More particularly, the engine control unit includes at least four timing maps, including a "cold running map"; a "light load map"; a "steady state map"; and a "transient state map" which are used to control the engine timing under the appropriate operating conditions given the fuel used and the level of carbon monoxide in the exhaust.

As indicated in FIG. 4 the engine control unit includes a read-only memory (ROM) where there is stored a plurality of predetermined engine timing control signals for various combinations of engine operating parameters, fuel type, and carbon monoxide levels in the engine exhaust. The actual values of the timing control signals are determined empirically for an engine family by carrying out tests on an engine (of that family) and compiling a schedule of the optimum values of engine timing for various combinations of engine operating conditions and fuels which will enable the engine to operate with an optimum balance between emissions performance and engine performance. After this engine timing schedule has been completed, the values are programmed into the various cells of read-only memory. The actual engine operating condition and exhaust gas signals are applied to the map during operation of the engine the engine control unit will output an engine control signal having the desired value, for the existing fuel, engine operating conditions, and carbon monoxide levels present in the engine exhaust which actively adjusts and sets the timing for engine operation.

Referring now to FIG. 4, there is shown a block diagram generally depicting the preferred method for controlling the fuel injection timing in an internal combustion engine using an aqueous fuel emulsion. As seen therein, the preferred method includes the initial step of generating a fuel injection control signal for the fuel injectors as a function of a desired fuel mass to be injected and other selected engine operating parameters (block 70). The next step involves determining a desired range of carbon monoxide (CO) emissions in the exhaust (block 72). The desired range includes a predetermined minimum CO threshold level and a predetermined maximum CO threshold level which are based, in part, on the engine configuration and engine operating conditions. Concurrently or sequentially, the actual level of carbon monoxide emissions present in the exhaust of the engine is determined or ascertained preferably using a carbon monoxide detector disposed proximate to the engine exhaust stream (block 74). Using both the actual or measured level of carbon monoxide together with the desired range of carbon monoxide in the engine exhaust, the next step is to determine a variance or error in the level of carbon monoxide emissions (block 76). This is preferably accomplished by comparing the measured level of carbon monoxide emissions to the predetermined minimum CO threshold level and the predetermined maximum CO threshold level.

The next step involves advancing the fuel injection timing of the fuel injection control signal by a prescribed amount if the variance indicates that the actual level of carbon monoxide emissions exceeds the predetermined maximum threshold level (block 78). Conversely, if the carbon monoxide variance indicates that the actual level of carbon monoxide emissions is below the predetermined minimum threshold level the fuel injection timing is retarded (block 80) by a prescribed amount or percentage. Lastly, if the carbon monoxide variance indicates that the measured or actual level of carbon monoxide emissions is between the predetermined minimum threshold level and the predetermined maximum threshold level, no adjustment is necessary (block 82). In any event, the adjustment of the fuel injection timing is preferably limited such that the timing profile of the fuel injectors does not exceed a predetermined maximum fuel injection timing profile and does not drop below a predetermined minimum fuel injection timing profile. Finally, the adjusted fuel injection control signal is forwarded to the fuel injectors thereby effectuating control of the fuel injection timing as a function of the carbon monoxide level in the exhaust stream (block 84).

The above-identified method for controlling the timing of the fuel injection can be utilized alone or in conjunction with other fuel system controlling techniques. Moreover, each of the specific steps involved in the preferred process, described herein, are easily modified or tailored to meet the peculiar operational requirements of the particular engine and the anticipated operating environment in which the engine is used.

From the foregoing, it should be appreciated that the present invention thus provides a method and system for the control of fuel injection timing in an internal combustion engine using a low cetane quality fuel such as an aqueous fuel emulsion. While the invention herein disclosed has been described by means of specific embodiments and processes associated therewith, numerous modifications and variations can be made thereto by those skilled in the art without departing from the scope of the invention as set forth in the claims or sacrificing all of the material advantages thereof.

What is claimed is:

1. A fuel control system for a compression ignition engine that utilizes a low cetane quality fuel, the fuel control system comprising:
   one or more fuel injectors adapted to inject said fuel into engine cylinders for combustion;
   a control unit operatively associated with said fuel injectors for generating a fuel delivery control signal operatively controlling the quantity of fuel introduced into said engine cylinders and the timimg of fuel injection by said fuel injectors;
   an exhaust gas sensor disposed in operative association with an exhaust stream from said engine and adapted for determining a level of selected exhaust products present in said exhaust stream; and
   said exhaust gas sensor further coupled to said control unit and wherein said control of the timimg of fuel injection is a function of the level of said selected exhaust products present in said exhaust stream.

2. The fuel control system of claim 1 wherein said low cetane quality fuel is an aqueous fuel emulsion.

3. The fuel control system of claim 1 wherein said selected exhaust products determined by said exhaust gas sensor include carbon monoxide.

4. The fuel control system of claim 3 wherein said exhaust gas sensor is a carbon monoxide detector.

5. The fuel control system of claim 3 wherein the fuel injection timing is retarded if the level of carbon monoxide present in said exhaust stream is below a prescribed minimum threshold.

6. The fuel control system of claim 3 wherein the fuel injection timing is advanced if the level of carbon monoxide present in said exhaust stream is above a prescribed maximum threshold.

7. A fuel control system for a flex fuel engine, the fuel control system comprising:
   one or more fuel storage systems adapted for supplying multiple fuels to said flex-fuel engine;
   one or more fuel injectors adapted to inject said fuels into the engine cylinders for combustion;
   a control unit operatively associated with said fuel storage systems for selecting the fuel to be injected by said fuel injectors based on selected engine operating parameters;
   said control unit further adapted for operatively controlling the quantity of said fuel injected by said fuel injectors and the timing of fuel injection by said fuel injectors;
   an exhaust gas sensor disposed proximate an exhaust stream from said engine and adapted for determining a level of selected exhaust products present in said exhaust stream; and
   said exhaust gas sensor further coupled to said control unit such that the timing of fuel injection is responsive to the level of said selected exhaust products present in said exhaust stream.

8. The fuel control system of claim 7 wherein one of said fuels is a low cetane quality fuel.

9. The fuel control system of claim 8 wherein one of said fuels is an aqueous fuel emulsion.

10. The fuel control system of claim 7 wherein said selected exhaust products determined by said exhaust gas sensor include carbon monoxide.

11. The fuel control system of claim 10 wherein said exhaust gas sensor is a carbon monoxide detector.

12. The fuel control system of claim 10 wherein the fuel injection timing is retarded if the level of carbon monoxide present in said exhaust stream is below a prescribed minimum threshold.

13. The fuel control system of claim 10 wherein the fuel injection timing is advanced if the level of carbon monoxide present in said exhaust stream is above a prescribed maximum threshold.

14. A method of controlling the fuel injection timing in an engine including one or more electronically controlled fuel injectors, the method comprising the steps of:
   (a) generating a fuel injection control signal for the control of said fuel injectors, said fuel injection control signal being a function of a desired fuel mass to be injected, said fuel being a low cetane quality fuel;
   (b) determining a desired range of carbon monoxide emissions in an exhaust stream of said engine;
   (c) ascertaining an actual level of carbon monoxide emissions present in said exhaust stream of said engine;
   (d) adjusting the timing of the fuel injection control signal if said actual level of carbon monoxide emissions is outside said desired range of carbon monoxide levels; and (e) forwarding said adjusted fuel injection control signal to said fuel injectors, said adjusted fuel injection control signal being a function of the carbon monoxide levels in said exhaust stream.

15. The method of claim 14 wherein the step of adjusting the timing of said fuel injection control signal further includes the steps of:

(d1) advancing the fuel injection timing of said fuel injection control signal if said actual level of carbon monoxide emissions exceeds said desired range of carbon monoxide levels; and (d2) retarding the fuel injection timing of said fuel injection control signal if said actual level of carbon monoxide emissions falls below said desired range of carbon monoxide levels.

16. The method of claim 14 wherein the step of ascertaining an actual level of carbon monoxide emissions present in said exhaust stream of said engine further includes the step of measuring the levels of carbon monoxide in said exhaust stream of said engine using a carbon monoxide detector.

17. The method of claim 14 wherein said low cetane quality fuel is an aqueous fuel emulsion.

18. The method of claim 14 wherein said engine is a flex fuel engine and said adjusted fuel injection control signal is a function of the type and quantity of fuel to be injected as well as the carbon monoxide level present in said exhaust stream.

* * * * *

UNITED STATES PATENT AND TRADEMARK OFFICE
CERTIFICATE OF CORRECTION

PATENT NO.    :   5,709,196

DATED         :   January 20, 1998

INVENTOR(S) :   Gerald N. Coleman, et al.

It is certified that error appears in the above-identified patent and that said Letters Patent is hereby corrected as shown below:

the Abstract

Line 7, second column of front page of Abstract paragraph, change "an fuel system" to read "a fuel system".

Column 7, line 58, change "timimg" to "timing".

Column 7, line 65, change "timimg" to "timing".

Signed and Sealed this

Twenty-sixth Day of May, 1998

Attest:

BRUCE LEHMAN

Attesting Officer        Commissioner of Patents and Trademarks